(12) United States Patent
Baba

(10) Patent No.: US 8,783,006 B2
(45) Date of Patent: Jul. 22, 2014

(54) CHAIN AND MANUFACTURING METHOD OF SLIDING MEMBER OF THE CHAIN

(71) Applicant: Daido Kogyo Co., Ltd., Ishikawa Pref. (JP)

(72) Inventor: Jun Baba, Ishikawa Pref. (JP)

(73) Assignee: Daido Kogyo Co., Ltd., Ishikawa Pref. (JP)

( * ) Notice: Subject to any disclaimer, the term of this patent is extended or adjusted under 35 U.S.C. 154(b) by 0 days.

(21) Appl. No.: 14/078,885

(22) Filed: Nov. 13, 2013

(65) Prior Publication Data

US 2014/0141912 A1 May 22, 2014

(30) Foreign Application Priority Data

Nov. 16, 2012 (JP) ................................ 2012-252587

(51) Int. Cl.
*F16G 13/06* (2006.01)

(52) U.S. Cl.
USPC ................. 59/35.1; 59/4; 59/8; 59/78; 59/84

(58) Field of Classification Search
USPC ......... 59/4, 8, 29, 35.1, 78, 84; 474/207, 231, 474/234
See application file for complete search history.

(56) References Cited

U.S. PATENT DOCUMENTS

| | | | |
|---|---|---|---|
| 3,136,664 A * | 6/1964 | Kuntzmann | .................. 474/231 |
| 6,607,850 B2 * | 8/2003 | Wang et al. | ...................... 75/235 |
| 7,343,730 B2 * | 3/2008 | Humcke et al. | ..................... 59/78 |
| 8,407,978 B2 * | 4/2013 | Hahn et al. | ..................... 59/35.1 |

FOREIGN PATENT DOCUMENTS

JP 2003-322222 11/2003

* cited by examiner

*Primary Examiner* — David B Jones
(74) *Attorney, Agent, or Firm* — Wenderoth, Lind & Ponack, L.L.P.

(57) ABSTRACT

A chain includes a plurality of sliding members that moves relative to each other. At least one of sliding members is formed of a martensitic stainless steel, and contains, in a superficial layer thereof, elemental substances of carbon and nitrogen at a range from 0.17 to 0.50 mass % in total, while a precipitation amount of carbide and nitride is 0.05 mass % or less in total.

17 Claims, 6 Drawing Sheets

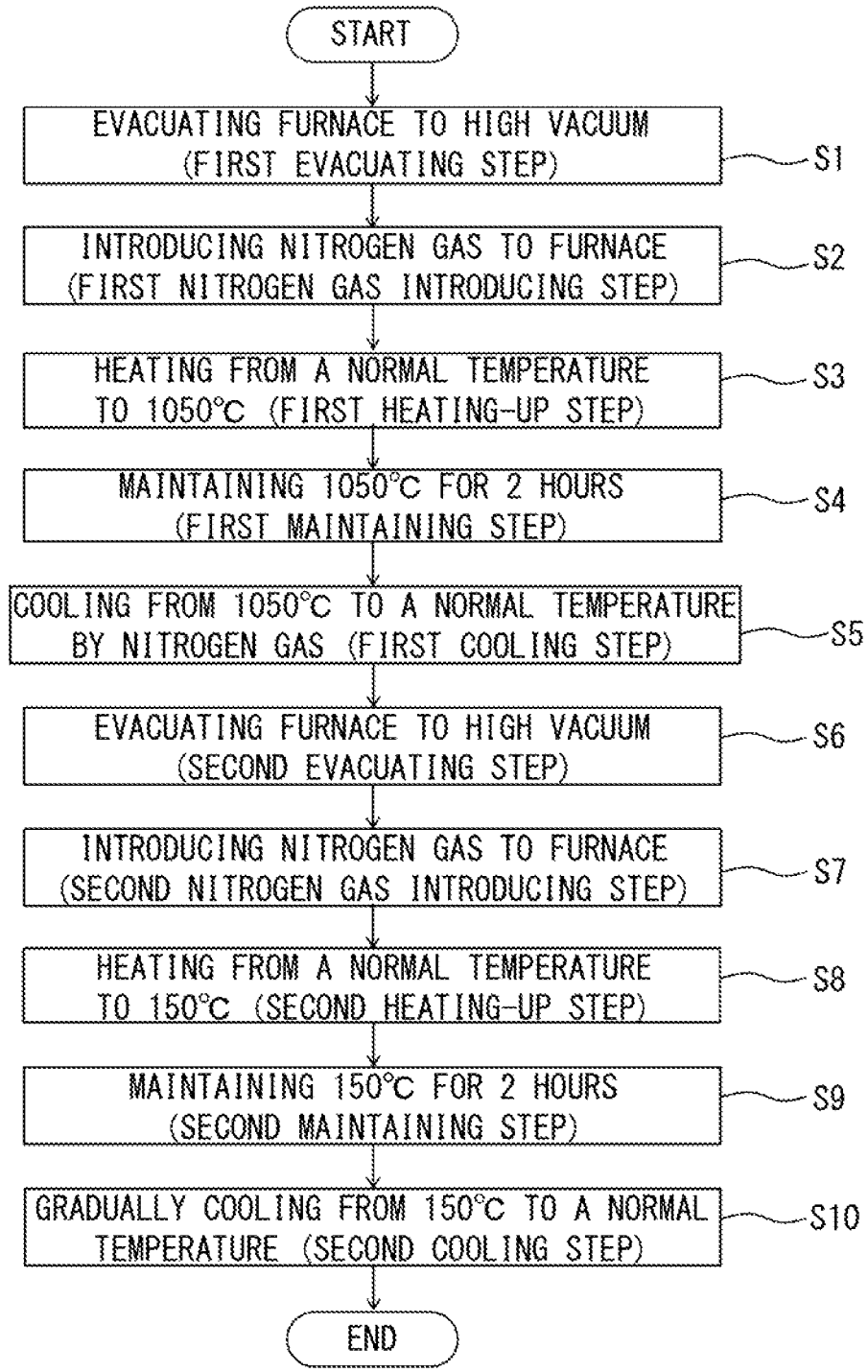

CHAIN AND MANUFACTURING METHOD OF SLIDING MEMBER OF THE CHAIN

BACKGROUND OF THE INVENTION

1. Field of the Invention

The present invention relates to a chain and a manufacturing method of a sliding member of the chain.

2. Description of the Related Art

Among various kinds of chains to be used for transmission of mechanical power such as roller chains, stainless steel chains have been widely used that are made of stainless steel whose corrosion resistance property is more excellent than that of steel. As a stainless steel used to make the stainless steel chain of this type, austenitic stainless steel, precipitation-hardened stainless steel, and the like have been know. Generally, the austenitic stainless steel is used very often, because the austenitic stainless steel is excellent in its corrosion resistance property, heat-treated in a simple manner, and relatively less expensive, as disclosed in JP-A-2003-322222.

However, the stainless steel chain made of the austenitic stainless steel, disclosed in JP-A-2003-322222, is somewhat disadvantageous in terms of hardness (strength), compared to a chain made of usual steel,.

In order to eliminate such a disadvantage, the sliding members should be made of the precipitation-hardened stainless steel, rather than the austenitic stainless steel, because the former can provide more excellent hardness. However, use of the precipitation-hardened stainless steel to produce the stainless steel chain causes other disadvantages in that complex heat treatment processes are required, and raw materials are relatively expensive, compared to the stainless steel chain made of the austenitic stainless steel.

SUMMARY OF THE INVENTION

According to a first aspect of the present invention, a chain is provided that comprises a plurality of sliding members that moves relative to each other, at least one of which is formed of a martensitic stainless steel, and contains, in a superficial layer thereof, elemental substances of carbon and nitrogen at a range from 0.17 to 0.50 mass % in total, while a precipitation amount of carbide and nitride is 0.05 mass % or less in total.

According to a second aspect of the present invention, a manufacturing method of a sliding member of a chain that slides against another member is provided. The method comprises a first evacuating step, wherein an environment around a sliding member made from martensitic stainless steel base material is evacuated; a first heating-up step, wherein a temperature of the sliding member is raised to a temperature range from 950° C. to 1050° C. after the first evacuating step; a first maintaining step, where the sliding member is maintained at a temperature range from 950° C. to 1050° C. for a period of time from 1 to 3 hours after the first hating step; a first nitrogen introducing step, wherein the environment around the sliding member is filled with nitrogen treatment gas, during a time period after the first evacuating step and before the first maintaining step; a first cooling step, wherein the sliding member is cooled by a nitrogen treatment gas to a normal temperature after the first maintaining step; a second evacuating step, wherein the environment around the sliding member is evacuated to vacuum after the first cooling step; a second heating-up step, wherein the sliding member is heated to a temperature range from 150° C. to 200° C. after the second evacuating step; a second maintaining step, wherein the sliding member is maintained at a temperature range from 150° C. to 200° C. after the second heating-up step; a second nitrogen introducing step, wherein the environment around the sliding member is filled with nitrogen treatment gas, during a time period after the second evacuating step and before the second maintaining step; and a second cooling step, wherein the sliding member is gradually cooled to a normal temperature after the second maintaining step.

Further features of the present invention will become apparent from the following description of exemplary embodiments with reference to the attached drawings. The accompanying drawings, which are incorporated in and constitute a part of the specification, illustrate exemplary embodiments, features, and aspects of the invention and, together with the description, serve to explain the principles of the invention.

BRIEF DESCRIPTION OF THE DRAWINGS

FIG. 2 is a flowchart illustrating a surface heat treatment method according to an embodiment of the present invention.

DESCRIPTION OF THE EMBODIMENTS

In the following, roller chains according to embodiments of the present invention will be described.

Figure 1A:
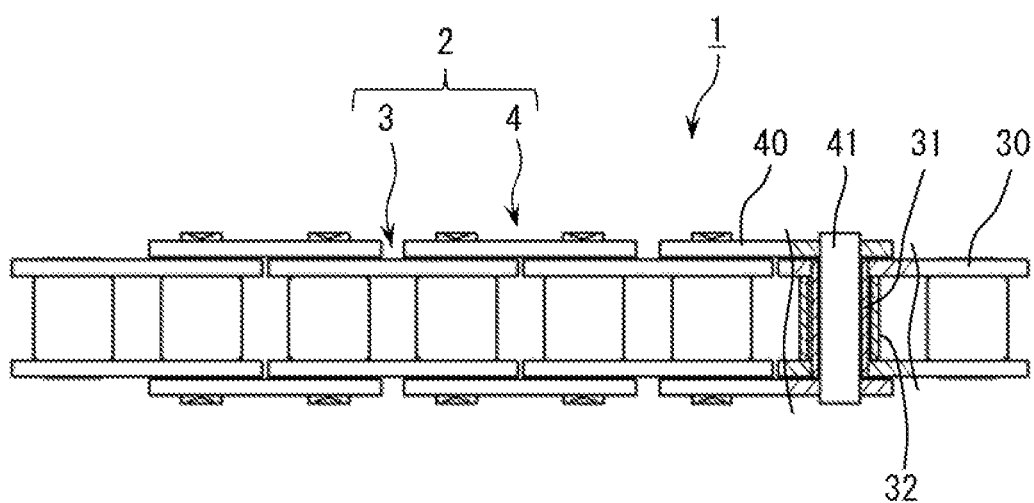
FIG. 1A is a plan view of a chain according to an embodiment of the present invention.
Figure 1B:
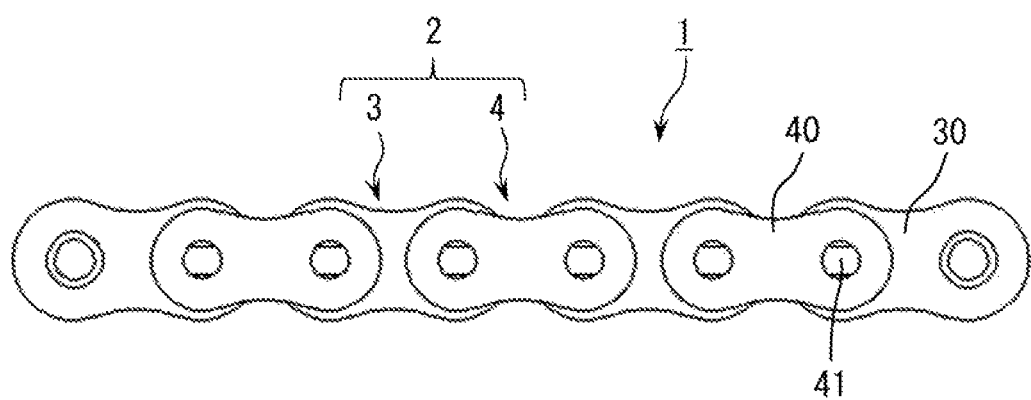
FIG. 1B is a front view of the chain illustrated in FIG. 1A.

Referring to FIG. 1, a roller chain 1 according to this embodiment is composed of a plurality of links 2 that are serially, endlessly linked in a form of a turning pair. Each of the links 2 is provided with an inner link 3 and an outer link 4.

The inner link 3 is formed of two inner plates 30 serving as link plates having an identical shape, which are linked by bushings 31 that are press-fitted to respective ends of the inner plates 30 and enclosed in respective rollers 32. The outer link 4 is formed of two outer link plates 4 serving as link plates, which are linked by pins 41 press-fitted to respective ends of the outer link plates 40. The pins 41 are inserted into the corresponding bushings 31 so as to alternately link the inner link 3 and the outer link 4, thereby to obtain the endlessly configured roller chain 1. Namely, the inner link 3 formed by linking the inner link plates 30 and the outer link 4 formed by linking the outer link plates 40 are linked by inserting the pins 41 into the corresponding bushings 31, thereby configuring the roller chain 1. These inner link plates 30 and the outer link plates 40 are made of the austenitic stainless steel, for example, SUS304 (Japanese Industrial Standards (JIS), equivalent to International Organization for Standardization (ISO) X5CrNi18-10).

The rollers 32 mesh with corresponding sprockets (not illustrated), so that the roller chain 1 can transmit mechanical power. When the roller chain 1 is driven, the roller 32 that meshes with the sprocket revolves relative to the associated busing 31 and this busing 31 revolves relative to the associated pin 41. Therefore, an inner circumferential surface of the roller 32 and an outer circumferential surface of the bushing 31 are likely to be worn with time; and an inner circumferential surface of the bushing 31 and an outer circumferential surface of the pin 41 are likely to be worn with time.

The pins 41, the bushings 31, and the rollers 32, which serve as sliding members of a chain, are made from a base material of the martensitic stainless steel, for example, SUS 403 (JIS), which is equivalent to ISO X12Cr13, the JIS SUS403 stainless steel contains 0.15 percent by mass (mass %, hereinafter) or less of carbon, 0.5 mass % or less of silicon, 1.00 mass % or less of manganese, 0.040 mass % or less of phosphorus, 0.030 mass % or less of sulfur, 11.50 to 13.00 mass % of chromium, and 0.60 mass % or less of nickel, in addition to primary constituent components. While in this embodiment, the SUS403 stainless steel is used to make the sliding members, other martensitic stainless steel, for example, SUS410 (JIS, equivalent to ISO X12Cr13), which contains the same elements at the same ratios as SUS403, may be used in other embodiments.

Figure 3:
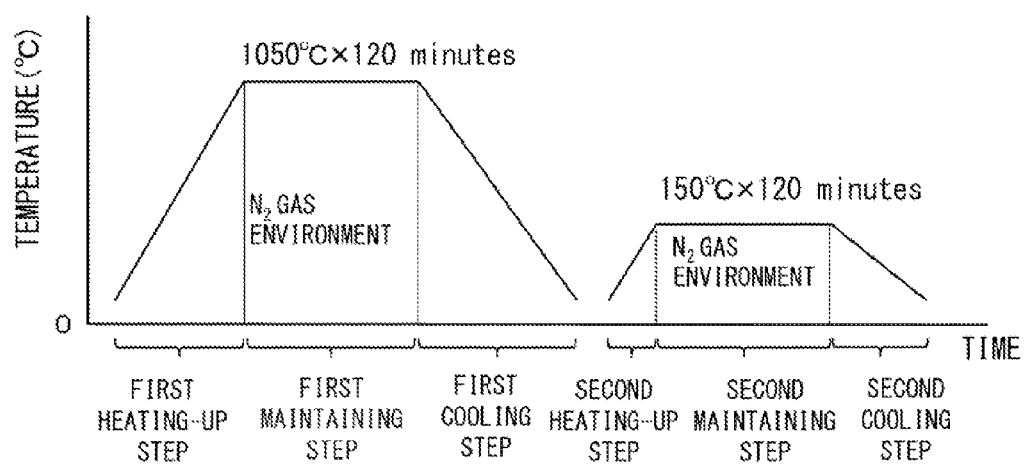
FIG. 3 is a time-chart illustrating procedures of the surface heat treatment method according to the embodiment of the present invention.
Figure 4:
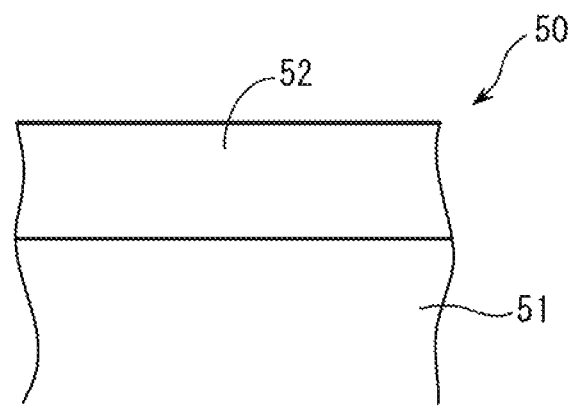
FIG. 4 is a schematic view of a superficial layer and a base material of a sliding member

In the following, procedures of a surface heat treatment method for the sliding member, which is capable of enhancing hardness and improving corrosion resistance of the sliding members, are described with reference to a flowchart of FIG. 2 and a time-chart of FIG. 3. Incidentally, the pins 41, the bushings 31, and the rollers 32 are made from substantially the same base material and subject to substantially the same treatment. Therefore, a collective term "sliding member 50" may be used in order to typify the sliding members of the pins 41, the bushings 41, and the roller 42 in the following. Incidentally, the sliding member 50 is composed of a base material (bulk portion) 51 and a superficial layer 52, and their relationship is illustrated in FIG. 4 for illustrative purposes.

The base material 51 of the martensitic stainless steel as a low carbon steel containing carbon in the range from 0.02 to 0.3 mass %. First, the sliding member 50 (see FIG. 4) is loaded into a furnace (not illustrated), and then the furnace is evacuated to a high vacuum (for example, 0.01 Pa) in Step S1 of FIG. 2. After a pressure of the furnace reaches a high vacuum, nitrogen gas is introduced into the furnace in Step S2 (first nitrogen gas introducing step).

Next, in Step S3, the furnace is heated up to 1050° C. (first heating-up step). Then, the sliding member 50 is maintained in the furnace substantially uniformly at 1050° C., for example, for 2 hours in Step S4 (first maintaining step). Due to these Steps S3 and S4, stainless steel constituting the base material 51 of the sliding member 50 is transformed into austenitic phase. In addition, nitrogen is permeated into the sliding member 50 from a surface thereof, and is diffused therein, and then comes to exist in a state of solid solution in the superficial layer 52, which has a depth of 0.1 to 0.2 mm and around from the surface.

After a lapse of 2 hours, the sliding member 50 is cooled down from 1050° C. to a normal temperature, taking, for example, 2 hours in Step S5 (first cooling step). At this time, nitrogen gas is preferably supplied to the furnace (in Step S5). With this cooling step, the sliding member 50 is quenched, and transformed into martensitic phase.

Next, the furnace is evacuated to a high vacuum (for example, 0.01 Pa) again in Step S6 (second evacuating step). After a pressure of the furnace reaches a high vacuum, nitrogen gas is introduced into the furnace in Step S7 (second nitrogen gas introducing step). Then, the sliding member 50 is heated to 150° C. from a normal temperature in Step S8 (second maintaining step). Subsequently, the sliding member 50 is maintained in the furnace substantially uniformly at 150° C., for example, for 2 hours in Step S9. With this, nitrogen is permeated into the sliding member 50 from a surface thereof, and diffused therein. Then, nitrogen comes to exist in a state of solid solution in the superficial layer 52.

After a lapse of 2 hours, the sliding member 50 is gradually cooled down from 150° C. to a normal temperature, in Step S10, and thus tempered (annealed).

With the above procedures, the superficial layer 52 (a depth of 0.1 to 0.2 mm and around from the surface) of the sliding member 50 has come to contain elemental substances of carbon and nitrogen in the range from 0.17 to 0.50 mass % in total, while a precipitation amount of carbide and nitride is 0.05 mass % or less in total.

Incidentally, although Steps S3, S4 are performed at 1050° C. in this embodiment, the temperature may be, for example, in the range from 950 to 1050° C. in other embodiments. In addition, although the sliding member 50 is kept at 1050° C. for 2 hours in Step S4 in this embodiment, the duration may be from 1 to 3 hours or around. Moreover, although the sliding member 50 is cooled down to a normal temperature for 2 hours in Step S5 in this embodiment, it may take 2 hours or less.

Moreover, although Steps S8, S9 are performed at a temperature of 150° C. in this embodiment, the temperature may be, for example, in the range from 150 to 200° C. in other embodiments. In addition, although the sliding member 50 is kept at 150° C. for 2 hours in Step S9 in this embodiment, the duration may be from 1 to 3 hours, for example. The temperature and the period of time may be arbitrarily changed in accordance with a size and a material of the sliding member 50, as is often the case with ordinary quenching and annealing.

In the following, explanations are made about the superficial layer 52 of the sliding member 50, which is obtained in accordance with the above procedures.

The sliding member 50 is made of the low-carbon martensitic stainless steel containing carbon at from 0.02 to 0.3 mass %, and the superficial layer 52 contains elemental carbon and nitrogen in the range from 0.17 to 0.50 mass % in total, while carbide and nitride are at 0.05 mass % or less in total. Here, the elemental carbon and nitrogen contained in the superficial layer 52 means carbon and nitrogen that do not form any chemical bonds with surrounding elements.

Figure 5A:
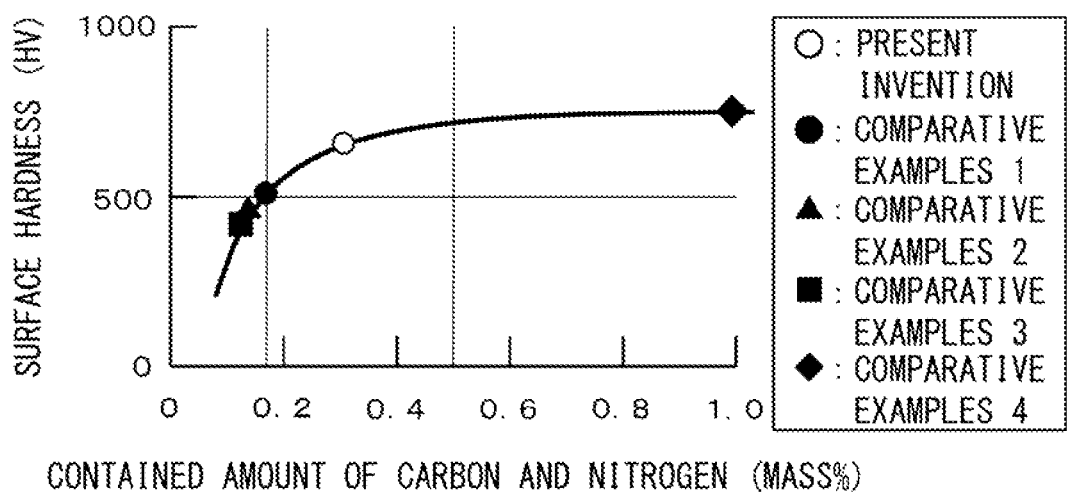
FIG. 5A is a graph illustrating a relationship between surface hardness and an amount of carbon and nitrogen contained in the superficial layer of the sliding member.

When a concentration of elemental carbon and nitrogen is less than 0.17 mass % in total, a desired hardness (for example, 500 HV) cannot be achieved (see FIG. 5A). Because the hardness of the superficial layer 52 becomes higher, as an amount of elemental carbon and nitrogen existing in a state of solid solution is increased, an amount of carbon and nitrogen of less than 0.17 mass % in a state of solid solution is thought to be insufficient to maintain the desired hardness. Incidentally, although the desired hardness is set at 500 HV in this embodiment, a desired hardness may be arbitrarily set depending on use conditions of the roller chain 1.

Figure 5B:
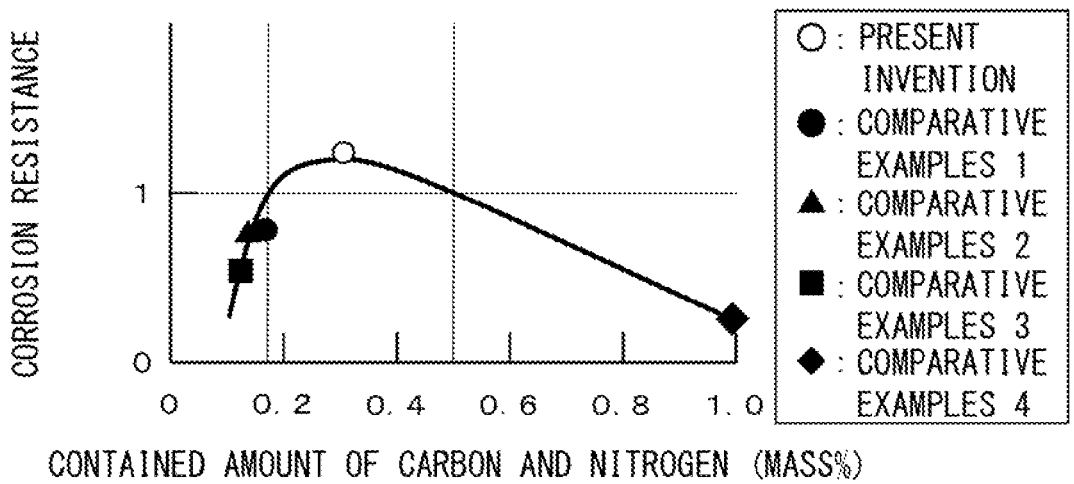
FIG. 5B is a graph illustrating a relationship between corrosion resistance and an amount of carbon and nitrogen contained in the superficial layer of the sliding member.

In addition, a concentration of elemental carbon and nitrogen is less than 0.17 mass % in total, a desired corrosion resistance (a relative value based on a copper-accelerated acetic acid salt spray test (CASS) test) cannot be achieved (see FIG. 5B). The reason for this can be considered as follows. When an amount of elemental carbon and nitrogen is, for example, about 0.3 mass % or less, an amount of chromium compounds in the superficial layer 52 is reduced by the surface heat treatment, and thus an amount of elemental chromium is increased, which enhances the corrosion resistance. When an amount of carbon and nitrogen existing in a state of solid solution is less than 0.17 mass % in the superficial layer 52, an increased amount of the elemental chromium is not sufficient. Incidentally, although the desired corrosion resistance is determined in accordance with the relative value obtained based on the CASS test in this embodiment, the desired corrosion resistance may be arbitrarily set depending on use conditions of the roller chain 1.

Furthermore, when a concentration of elemental carbon and nitrogen exceeds 0.5 mass %, the desired corrosion resistance cannot be achieved (see FIG. 5B). The reason for this can be considered as follows. When an amount of elemental carbon and nitrogen is, for example, about 0.3 mass % or greater, as an amount of elemental carbon and nitrogen existing in a state of solid solution is increased in the superficial layer 52, an amount of chromium compounds is increased in the superficial layer 52, which reduces an amount of elemental chromium, thereby to reduce the corrosion resistance. Therefore, a total amount of elemental carbon and nitrogen of 0.5 mass % or greater reduces unnecessarily the amount of elemental chromium and thus the corrosion resistance.

Accordingly, in order to achieve the desired hardness and corrosion resistance, a concentration of elemental carbon and nitrogen contained in the superficial layer 52 is preferably set to be in the range from. 0.17 to 0.50 mass % in total, and more preferably 0.3 mass %. Namely, the present embodiment makes it possible to let nitrogen reside appropriately in a state of solid solution in the superficial layer 52 of the sliding member 50. The adoption of the vacuum heat treatment which evacuates the furnace to the high vacuum before forming the nitrogen atmosphere by introducing nitrogen gas into the furnace also allows the heat processing to be carried out within a nitrogen atmosphere (furnace pressure is equal to or more than normal pressure) from which oxygen is eliminated as much as possible, a chemical reaction of oxygen and chromium, carbon and chromium, oroxygen and nitrogen to be suppressed, and appropriate amount of elemental chromium (simple substance of chromium) to be remained. Therefore, it is possible to obtain the desirable hardness and corrosion resistance. Incidentally, a high vacuum means here that a pressure inside the furnace is in the range from 0.1 to $10^{-5}$ Pa.

In this embodiment, the sliding member 50 is made of the martensitic stainless steel containing carbon in the range from 0.02 to 0.3 mass %. Therefore, even when nitrogen is permeated into the superficial layer 52 to an amount of about 0.2 mass % by the surface heat treatment, the total amount of elemental carbon and nitrogen is at most 0.5 mass % or around. Accordingly, the desired hardness and corrosion resistance can be achieved. It is noted that even though the sliding member 50 is underwent the above described heating treatment, the martensitic stainless steel containing carbon in the range from 0.02 to 0.3 mass % remains as it is in an inner side of the superficial layer 52 as a base material potion 51.

In addition, when a total amount of carbide and nitride precipitated in the superficial layer 52 exceeds 0.05 mass %, a desired corrosion resistance cannot be achieved. As an amount of carbide and nitride precipitated in the superficial layer 52 is increased, an amount of chromium compounds therein is increased, which in turn reduces an amount of elemental chromium in the superficial layer 52. Namely, when an amount of carbide and nitride precipitated therein exceeds 0.05 mass %, an amount of elemental chromium is unnecessarily reduced, and thus corrosion resistance is reduced. The insufficient corrosion resistance in this case can be explained in such a manner.

In addition, even when an amount of the precipitated carbide and nitride is 0 mass % in total, the desired hardness can be obtained. This is because elemental carbon and nitrogen are contained. Moreover, when an amount of the precipitated carbide and nitride is 0 mass % in total, the amount of chromium compounds becomes the minimum, which means that an amount of elemental chromium is increased. This is preferable in that the corrosion resistance is enhanced.

Accordingly, in order to achieve the desired corrosion resistance, an amount of carbide and nitrogen precipitated in the superficial layer 52 is preferably set to be in the range from 0 to 0.05 mass % in total, and more preferably 0 mass %.

According to this embodiment, because every one of the superficial layers 52 of the pins 41, the bushings 31, and the rollers 32 contains elemental carbon and nitrogen in the range from 0.17 to 0.50 mass % in total, and a precipitation amount of carbide and nitride is 0.05 mass % or less in total, higher hardness and corrosion resistance can be achieved.

The roller chain 1 is wound around the sprockets (not illustrated) and used, for example, to transmit mechanical power. When the roller chain 1 is in use, friction takes place between the pins 41 and the corresponding bushings 31, between the bushings 31 and the corresponding rollers 32, and between the rollers 32 and the sprockets. Because the pins 41, the bushings 31, and the rollers 32 undergo the above surface heat treatment thereby to gain higher hardness and corrosion resistance, the roller chain 1 can be highly durable.

As described above, in the roller chain 1 according to this embodiment, the pins 41, the bushings 31, and the rollers 32 are made of the martensitic stainless steel. Therefore, excellent formability is obtained at lower costs, compared with pins, bushings, and rollers that are made of the austenitic stainless steel. In addition, because the sliding member 50 undergoes the above surface heat treatment, hardness and corrosion resistance can be concurrently achieved at higher levels. Because the hardness and corrosion resistance of the pins 41, the bushings 31, and the rollers 32 are enhanced, a lifetime of the roller chain 1 can be lengthened. In addition, the surface heat treatment method can be simply performed in substantially the same manner as quenching and tempering (annealing) under prescribed condition, thereby to circumvent procedural complexities.

Moreover, in the roller chain 1 according to this embodiment, only the pins 41, the bushings 31, and the rollers 32 are made of the martensitic stainless steel and undergo the surface heat treatment, while the inner link plates 30 and the outer link plates 40 are made of the austenitic stainless steel and do not undergo the surface heat treatment. With this, when the pins 41 are press-fitted into the corresponding outer link plates 40, the outer link plates 40 are deformed due to a hardness difference between the pins 41 and the outer link plates 40. Therefore, both the pins 41 and the outer link plates 40 can be prevented from being damaged. Similarly, when the bushings 31 are press-fitted into the corresponding inner link plates 30, because the inner link plates 30 are deformed, both the bushings 31 and the inner link plates 30 can be prevented from being damaged.

Incidentally, in the roller chain 1 according to this embodiment, only the pins 41, the bushings 31, and the rollers 32 are made of the martensitic stainless steel and undergo the surface heat treatment, as described above. However, the present invention is not limited to this embodiment. For example, the inner link plates 30 and the outer link plates 40 may be made of the martensitic stainless steel and undergo the surface. In addition, one or two of the pins 41, the bushings 31, and the rollers 32 (for example, the pins 41 and the bushings 31 only, the pins 41 only, or the like) may be made of the martensitic stainless steel and undergo(es) the surface heat treatment, rather than all of the pins 41, the bushings 31, and the rollers 32. In other words, at least one of the plural sliding members has to be made of the martensitic stainless steel and undergo the surface heat treatment described above.

Moreover, although the roller chain 1 has been explained as one embodiment of the present invention, the present invention can be applied to any types of chains, as long as the chain includes plural link plates and pins that bendably (or slidably) link the link plates. Specifically, the present invention is applicable to chains commonly used in industry, such as a bushing chain and a silent chain.

The busing chain is composed of outer links each of which includes a pair of outer link plates that are to be linked at both ends thereof by pins, and inner links each of which includes a pair of inner link plates that are to be linked at both ends thereof by pins. Here, the outer links and the inner links are alternately linked by inserting the pins into corresponding bushings. When the present invention is applied to the bushing chain, at least one of the pins and the bushings is the sliding member that has to be made of the martensitic stainless steel and undergo the surface heat treatment. In addition, when the present invention is applied to a silent chain and a leaf chain, which are composed of plural plates that are alternately linked by pins, at least one of the pins and the link plates, each of which has pin holes slidably connected to the corresponding pins, has to be made of the martensitic stainless steel and undergoes the surface heat treatment. Incidentally, the present invention is applicable to a chain whose link plates are made of standard steel rather than the stainless steel.

As described, because at least one of the sliding members is made from a martensitic stainless steel base material, a leas expensive chain with excellent formability can be obtained. In addition, the superficial layer of the sliding member contains elemental carbon and nitrogen in the range from 0.17 to 0.50 mass % in total, while a precipitation amount of carbide and nitride is 0.05 mass % or less in total. Therefore, an amount of the chromium compounds is reduced and thus an amount of elemental chromium is increased, thereby to enhance the corrosion resistance. Accordingly, higher hardness and corrosion resistance can be concurrently achieved.

Moreover, because the martensitic stainless steel containing carbon at 0.02 to 0.3 mass % is used to make the sliding member concerned, the superficial layer thereof can surely contain a predetermined amount of elemental carbon and nitrogen. With this, the hardness and corrosion resistance of the superficial layer of the sliding member can be concurrently achieved at higher levels.

Furthermore, because not only the sliding members but also all chain-constituting members, including link plates of, for example, the roller chain, the bushing chain, the silent chain, the leaf chain, and the like, are made of the stainless steel, corrosion due to electric potential difference is prevented, which enhances corrosion resistance and thus surface hardness of the superficial layer of the sliding member. Therefore, a life time of the chain can be lengthened.

In addition, use of the martensitic stainless steel base material to make the sliding member provides excellent formability at low costs. Besides, the simple heat treatment method makes it possible for the superficial layer of the sliding member to contain elemental carbon and nitrogen in the range from 0.17 to 0.50 mass % in total, while a precipitation amount of carbide and nitride is 0.05 mass % or less in total. Therefore, higher hardness and corrosion resistance can be concurrently achieved.

Moreover, because the vacuum heat treatment which evacuates the furnace to the high vacuum is performed before forming the nitrogen atmosphere by introducing nitrogen gar into the furnace, it is possible to prevent decarburization from the stainless steel, and to enhance a degree of diffusion of nitrogen in the superficial layer of the stainless steel. Therefore, the superficial layer of the sliding member surely contains elemental carbon and nitrogen in the range from 0.17 to 0.50 mass % in total, while a precipitation amount of carbide and nitride is 0.05 mass % or less in total. Accordingly, higher hardness and corrosion resistance can be concurrently achieved.

In addition, the surface heat treatment adpoted the vacuum heat treatment are preformed on the roller chain 1 in this embodiment. However, the present invention is not restricted to that and other surface heat treatment methods may be employed. Specifically, a In the surface heat treatment method for the sliding members of the roller chain 1 according to this embodiment, Steps S1 (first evacuating step), S2 (first nitrogen introducing step), and S3 (first heating-up step) are performed in this order. However, procedures of the surface heat treatment method are not limited to the above order. For example, Step S2 (first nitrogen introducing step) may be performed during a time period after Step S1 (first evacuating step) and before Step S4 (first maintaining step). For example, after Steps S1 and S3 are performed in this order, Step S2 may be performed. Alternatively, after Step S1 is performed, Step S2 may be performed when Step S3 is being performed.

Similarly, although Step S7 (second nitrogen introducing step) is performed after Step S6 (second evacuating step), and then Step S8 (second heating-up step) is performed, Step S7 may be performed during a time period after Step S6 and before Step S9 (second maintaining step). For example, after Steps S6 and S8 are performed in this order, Step S7 may be performed. Alternatively, after Step S6 is performed, Step S7 may be performed when Step S8 is being performed.

Next, a surface heat treatment method according to another embodiment of the present invention is explained with reference to FIG. 6 in the following.

Figure 6:
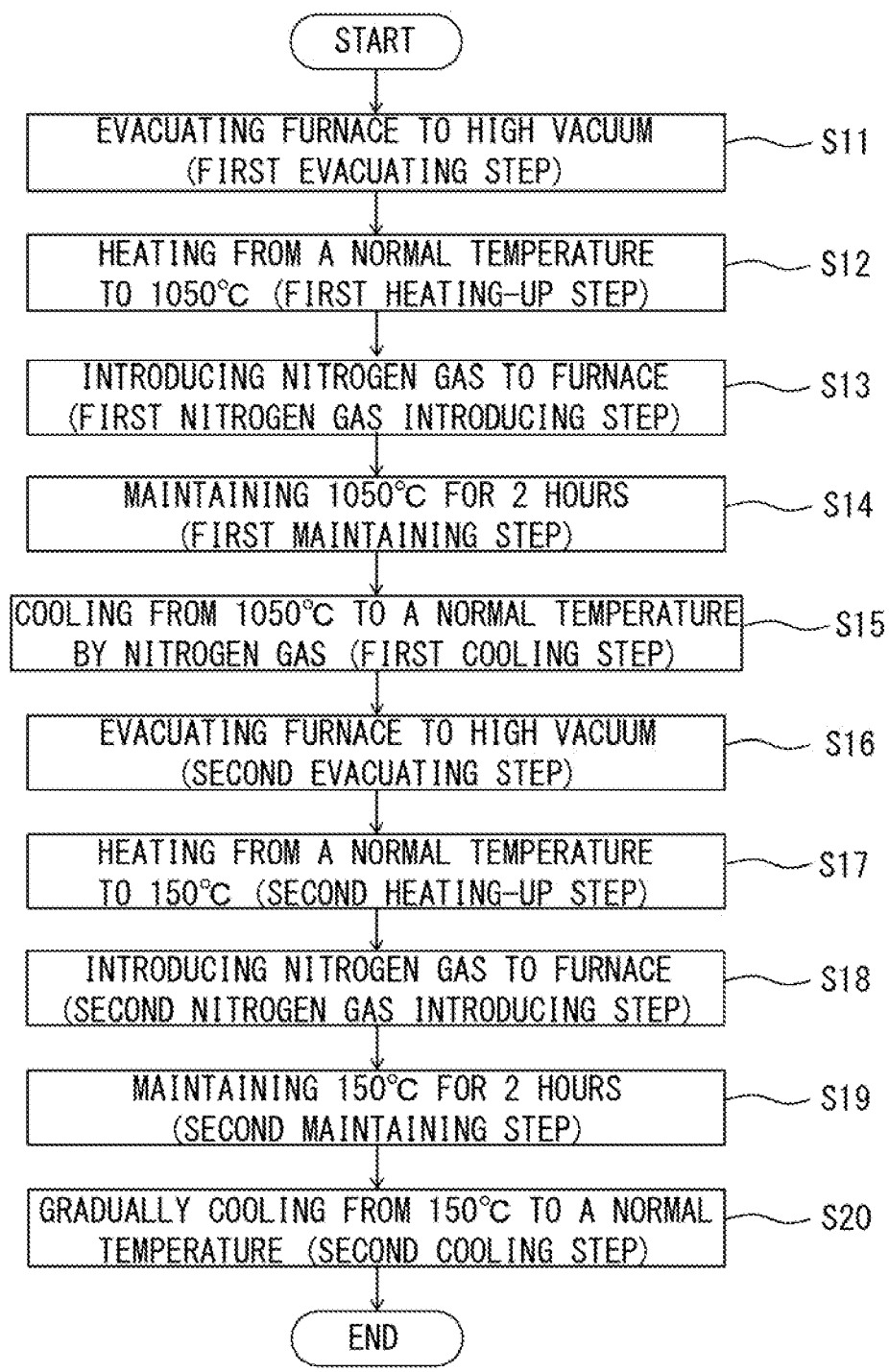
FIG. 6 is a flowchart illustrating procedures of a surface heat treatment method according to another embodiment of the present invention.

Specifically, the sliding member 50 (see FIG. 4) is loaded into a furnace (not illustrated), and then the furnace is evacuated to a high vacuum (for example, 0.01 Pa) in Step S11 (first evacuating step) of FIG. 6. Then, the furnace is heated up to 1050° C. from a normal temperature (Step S12, first heating-up step). After the temperature reaches 1050° C., nitrogen gas is introduced into the furnace (Step S13, first nitrogen gas introducing step) and the sliding member 50 is maintained at a substantially uniform temperature of 1050° C., for example, for 2 hours in Step S14. With this, nitrogen is permeated into the sliding member 50 from a surface thereof, and diffused therein. Then, nitrogen comes to exist in a state of solid solution in the superficial layer 52.

After a lapse of 2 hours, the sliding member 50 is cooled down to a normal temperature from 1050° C., preferably with nitrogen gas supplied info the furnace (Step S15, first cooling step). With this, the sliding member 50 is quenched, and transformed into martensitic phase.

Next, the furnace is evacuated to a high vacuum (for example, 0.01 Pa) in Step 16 (second evacuating step) , and then the sliding member 50 in the furnace is heated up to 150° C. in Step S17 (second heating-up step). Then, after the temperature reaches 150° C., nitrogen gas is introduced into the furnace in Step S18 (second nitrogen introducing step), and the sliding member 50 is maintained in the furnace substantially uniformly at 150° C., for example, for 2 hours in Step S19 (second maintain step). At this time, nitrogen is permeated into the sliding member 50 from a surface thereof, and is diffused therein, and then comes to exist in a state of solid solution in the superficial layer 52. After a lapse of 2 hours, the sliding member 50 is gradually cooled down from 150° C.

to a normal temperature in the furnace in Step 20 (second cooling step), and thus tempered.

Next, a Working Example and Comparative Examples are explained with reference to FIGS. 5A and 5B. All samples in these examples were made of JIS SUS403 stainless steel, which is a martensitic stainless steel. A sample of Working Example underwent the surface heat treatment illustrated in FIG. 2, according to a temperature profile illustrated in FIG. 3. On the other hand, samples in Comparative Examples underwent various heat treatments as explained later. For each sample, an amount of elemental carbon and nitrogen (mass %) and surface hardness (HV) were measured. Measurement results are summarized in a graph of FIG. 5A. In this graph, when a surface hardness is 500 or greater (HV), the superficial layers of the samples have sufficient hardness. Incidentally, although a threshold about whether a sufficient hardness is achieved is set at 500 HV here, a threshold may be determined depending on use conditions of a chain to be made with the samples.

In addition, for each sample, an amount of elemental carbon and nitrogen and corrosion resistance were measured. Measurement results are summarized in FIG. 5B. Here, the corrosion resistance was evaluated based on the CASS test. When a relative value based on the CASS test is 1 or greater, it is determined that sufficient corrosion resistance is achieved. On the other hand, when a relative value based on the CASS test is less than 1, it is determined that corrosion resistance is not sufficient. In addition, a precipitation amount of carbide and nitride (an amount of precipitated compounds) (mass %) was also measured for each sample. Incidentally, although a threshold about whether sufficient corrosion resistance is achieved is set at a relative value of 1 here, the threshold may be determined depending on use conditions of the chain to be made with the sample.

Working Example

The sample of Working Example was subject to the surface heat treatment adopted the controlled atmosphere heat treatment according to this embodiment. Specifically, pressures of the furnace (not illustrated) at Steps S1 and S6 (first and second evacuating steps) were 0.01 Pa. In addition, nitrogen gas is introduced into the furnace in Steps S2 and S7 (first and second nitrogen introducing steps). Measurements have revealed: an amount of elemental carbon and nitrogen was 0.321 mass %; a precipitation amount of carbon and nitride was 0.012 mass %; surface hardness was 676 HV; and corrosion resistance exceeded 1. Therefore, sufficient surface hardness and corrosion resistance is achieved. This is thought to be because the heat treatment performed under the nitrogen atmosphere formed by introducing nitrogen gas into the furnace after the furnace was evacuated to a high vacuum makes it possible to suppress decarburization, to increase an amount of nitrogen permeated into and diffused in the superficial layer of the sample, and to prevent a chemical reaction between oxygen and chromium, carbon and chromium.

Comparative Example 1

As for the sample of Comparative Example 1, Steps S1 and S6 (first and second evacuating steps) were performed at a medium vacuum (20 Pa); and nitrogen gas was introduced into the furnace in Steps S2 and S7 (first and second nitrogen introducing steps). Measurements have revealed: an amount of elemental carbon and nitrogen was 0.116 mass %; a precipitation amount of carbide and nitride was 0.010 mass %; surface hardness was 526 HV; and corrosion resistance is less than 1. Because the pressure is higher in Steps S1 and S6 in this Comparative Example 1 than in Working Example, decarburization is more like to take place in Comparative Example 1 than in Working Example, and an amount of nitrogen permeated into the sample of Comparative Example 1. Therefore, a carbon concentration in the superficial layer of the sample of Comparative Example 1 is lower, and an amount of nitrogen permeated into the sample is also lower, compared to the superficial layer of the sample of Working Example. Accordingly, sufficient corrosion resistance cannot be achieved, while an amount of elemental carbon and nitrogen is 0.166 mass %, which may mean sufficient surface hardness is achieved. By comparing Working Example and Comparative Example 1, it can be concluded that the pressure in Steps S1 and S2 needs to be less than 20 Pa.

Comparative Example 2

As for the sample of Comparative Example 2, Steps S1 and S6 (first and second evacuating steps) were performed at a high vacuum (0.01 Pa); and Steps S2 and S7 were not performed. In fact, nitrogen gas was not introduced in Steps S2 and S7. Measurements have revealed: an amount of elemental carbon and nitrogen was 0.132 mass %; a precipitation amount of carbide and nitride was 0.005 mass %; surface hardness was 450 HV; and corrosion resistance is less than 1. Because the furnace was evacuated into the high vacuum before performing surface heating treatment to the sample of Comparative Example 2, decarburization scarcely took place. On the other hand, because there was substantially no nitrogen gas in the furnace, substantially no nitrogen was permeated into the sample. Accordingly, an amount of elemental carbon and nitrogen is as low as 0.132 mass %. From these results, surface hardness and corrosion resistance are not sufficient in Comparative Example 2.

Comparative Example 3

As for the sample of Comparative Example 3, Steps S1 and S6 (first and second evacuating steps) were not performed. In addition, steps where an endothermic modified gas was introduced were performed, instead of Steps S2 and S7 (first and second nitrogen introducing steps) and the sample was heated under an environment of the endothermic modified gas. Here, the endothermic modified gas contains 18 to 25 vol. % of carbon monoxide, 28 to 40 vol. % of hydrogen, 44 vol. % of nitrogen, and the balance of carbon dioxide or the like (an equilibrium carbon concentration is 0.1%). Measurements have revealed: an amount of elemental carbon and nitrogen was 0.125 mass %; a precipitation amount of carbide and nitride was 0.010 mass %; surface hardness was 423 HV; and corrosion resistance is less than 1. Because the sample was heated under substantially a nitrogen-depleted environment, nitrogen is scarcely permeated into the sample, and thus an amount of elemental carbon and nitrogen is as low as 0.125 mass %. In addition, because the sample was heated under an environment of the above endothermic modified gas, oxidized scale is caused, and thus a concentration of chromium was reduced in a surface of the sample. Therefore, surface hardness and corrosion resistance are not sufficient in Comparative Example 3.

Comparative Example 4

As for the sample of Comparative Example 4, Steps S1 and S6 (first and second evacuating steps) were not performed. In addition, steps where another endothermic modified gas (an equilibrium carbon concentration is 1.0%) was introduced were performed, instead of Steps S2 and S7 (first and second nitrogen introducing steps) and the sample was heated under an environment of the another endothermic modified gas. Measurements have revealed: an amount of elemental carbon and nitrogen was 1.010 mass %; a precipitation amount of carbide and nitride was 0.880 mass %; surface hardness was 740 HV; and corrosion resistance is less than 1. Because the sample was heated under substantially a nitrogen-depleted environment, nitrogen is scarcely permeated into the sample. In addition, because carburization is promoted by the above endothermic modified gas, an amount of elemental carbon and nitrogen is increased up to 1.010 mass %, so that extremely high surface hardness is achieved. However, because an amount of elemental carbon and nitrogen exceeds 0.50 mass %, a precipitation amount of mainly carbide is increased up to 0.880 mass %, which reduces an amount of chromium in a form of solid solution. Therefore, corrosion resistance of the sample in this Comparative Example is not sufficient.

Accordingly, it has been confirmed from the above results that the sliding member according to this embodiment of the present invention can meet desired requirements in surface hardness and corrosion resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No.2012-252587, filed Nov. 16, 2012, which is hereby incorporated by reference herein in its entirety.

What is claimed is:

1. A chain comprising:
a plurality of sliding members that moves relative to each other, at least one of which is formed of a martensitic stainless steel, and contains, in a superficial layer thereof, elemental substances of carbon and nitrogen at a range from 0.17 to 0.50 mass % in total, while a precipitation amount of carbide and nitride is 0.05 mass % or less in total.

2. The chain according to claim 1, wherein the martensitic stainless steel includes a base material portion which containing carbon in a range from 0.02 to 0.3 mass % and exists in an inner side of the superficial layer.

3. The chain according to claim 2, further comprising a plurality of link plates,
wherein the sliding members includes pins that bendably link the plurality of link plates, and
wherein each one of all the sliding members and the plurality of the link plates is made of stainless steel.

4. The chain according to claim 1, further comprising:
a plurality of outer link plates; and
a plurality of inner link plates,
wherein the sliding members include
pins by which a pair of the outer link plates is linked at both end portions, thereby to form an outer link; and
bushings by which a pair of the inner link plates is linked at both end portions, thereby to form an inner link, and through which the corresponding pins are inserted, thereby to alternatively link the outer links and the inner links, and
wherein the pins and the bushings are included in the at least one of the sliding members.

5. The chain according to claim 3, wherein the plurality of the link plates includes:

a plurality of outer link plates; and
a plurality of inner link plates,
wherein the sliding members include:
pins by which a pair of the outer link plates is linked at both end portions, thereby to form an outer link; and
bushings by which a pair of the inner link plates is linked at both end portions, thereby to form an inner link, and through which the corresponding pins are inserted, thereby to alternatively link the outer links and the inner links, and
wherein the pins and the bushings are included in the at least one of the sliding members.

6. The chain according to claim 4, wherein the sliding members include rollers that enclose the corresponding bushings, and
wherein the rollers are included in the sliding members.

7. The chain according to claim 5, wherein the sliding members include rollers that enclose the corresponding bushings, and
wherein the rollers are included in the sliding members.

8. The chain according to claim 4, wherein the outer link plates and the inner link plates are made of austenitic stainless steel.

9. The chain according to claim 6, wherein the outer link plates and the inner link plates are made of austenitic stainless steel.

10. The chain according to claim 7, wherein the outer link plates and the inner link plates are made of austenitic stainless steel.

11. A chain comprising:
a plurality of link plates; and
pins that bendably link the link plates,
wherein the pins are formed of a martensitic stainless steel, and contains, in a superficial layer thereof, elemental substances of carbon and nitrogen at a range from 0.17 to 0.50 mass % in total, while a precipitation amount of carbide and nitride is 0.05 mass % or less in total.

12. The chain according to claim 11, further comprising bushings that enclose the corresponding pins thereby to link links formed by linking the link plates,
wherein the bushings are formed of a martensitic stainless steel, and contains, in a superficial layer thereof, elemental substances of carbon and nitrogen at a range from 0.17 to 0.50 mass % in total, while a precipitation amount of carbide and nitride is 0.05 mass % or less in total.

13. The chain according to claim 11, further comprising rollers that enclose the corresponding bushings,
wherein the rollers are formed of a martensitic stainless steel, and contains, in a superficial layer thereof, elemental substances of carbon and nitrogen at a range from 0.17 to 0.50 mass % in total, while a precipitation amount of carbide and nitride is 0.05 mass % or less in total.

14. The chain according to claim 11, wherein the link plates are formed of a martensitic stainless steel, and contains, in a superficial layer thereof, elemental substances of carbon and nitrogen at a range from 0.17 t 0.50 mass % in total, while a precipitation amount of carbide and nitride is 0.05 mass % or less in total.

15. A manufacturing method of a sliding member of a chain that slides against another member, the method comprising:
a first evacuating step, wherein an environment around a sliding member made from martensitic stainless steel base material is evacuated;

a first heating-up step, wherein a temperature of the sliding member is raised to a temperature range from 950° C. to 1050° C. after the first evacuating step;

a first maintaining step, where the sliding member is maintained at a temperature range from 950° C. to 1050° C. for a period of time from 1 to 3 hours after the first hating step;

a first nitrogen introducing step, wherein the environment around the sliding member is filled with nitrogen treatment gas, during a time period after the first evacuating step and before the first maintaining step;

a first cooling step, wherein the sliding member is cooled by a nitrogen treatment gas to a normal temperature after the first maintaining step;

a second evacuating step, wherein the environment around the sliding member is evacuated to vacuum after the first cooling step;

a second heating-up step, wherein the sliding member is heated to a temperature range from 150° C. to 200° C. after the second evacuating step;

a second maintaining step, wherein the sliding member is maintained at a temperature range from 150° C. to 200° C. after the second heating-up step;

a second nitrogen introducing step, wherein the environment around the sliding member is filled with nitrogen treatment gas, during a time period after the second evacuating step and before the second maintaining step; and a second cooling step, wherein the sliding member is gradually cooled to a normal temperature after the second maintaining step.

16. The manufacturing method of the sliding member of the chain that slides against another member, according to claim 15, wherein the environment around the sliding member is kept at less than 20 Pa in the first evacuating step and the second evacuating step.

17. The manufacturing method of the sliding member of the chain that slides against another member, according to claim 15, wherein the sliding member formed by the martensitic stainless steel containing carbon in a range from 0.02 to 0.3 mass %.

* * * * *